US012005020B2

(12) United States Patent
Grey et al.

(10) Patent No.: US 12,005,020 B2
(45) Date of Patent: Jun. 11, 2024

(54) AUTOMATED MASSAGE APPARATUS

(71) Applicant: GREY TECHNOLOGY LIMITED, Warndon (GB)

(72) Inventors: Nicholas Gerald Grey, Warndon (GB); Matthew Isted, Warndon (GB); Daniel Brooks, Warndon (GB)

( * ) Notice: Subject to any disclaimer, the term of this patent is extended or adjusted under 35 U.S.C. 154(b) by 805 days.

(21) Appl. No.: 16/975,123

(22) PCT Filed: Feb. 28, 2019

(86) PCT No.: PCT/EP2019/055082

§ 371 (c)(1),
(2) Date: Aug. 22, 2020

(87) PCT Pub. No.: WO2019/166597

PCT Pub. Date: Sep. 6, 2019

(65) Prior Publication Data

US 2021/0085556 A1 Mar. 25, 2021

(30) Foreign Application Priority Data

Feb. 28, 2018 (GB) ..................................... 1803254

(51) Int. Cl.

| | |
|---|---|
| ***A61H 15/00*** | (2006.01) |
| ***A61G 13/00*** | (2006.01) |
| ***A61G 13/10*** | (2006.01) |

(52) U.S. Cl.

CPC ....... *A61H 15/0078* (2013.01); *A61G 13/009* (2013.01); *A61G 13/105* (2013.01);

(Continued)

(58) Field of Classification Search

CPC ........ A61H 15/0078; A61H 2015/0014; A61H 2201/0142; A61H 2201/1207; A61H 2201/1671; A61H 2203/0443; A61H 2201/0161; A61H 2201/0192; A61H 2201/1215; A61H 2201/149;

(Continued)

(56) References Cited

U.S. PATENT DOCUMENTS 4,656,998 A * 4/1987 Masuda ............ A61H 15/0078 601/116
4,886,051 A 12/1989 White (Continued)

FOREIGN PATENT DOCUMENTS

CN 202537931 U 11/2012
CN 105395348 A 3/2016

(Continued)

OTHER PUBLICATIONS

English translation for JP H08215264A (Year: 1996).*

(Continued)

*Primary Examiner* — Quang D Thanh
(74) *Attorney, Agent, or Firm* — Pedersen & Company, PLLC; Ken J. Pedersen; Barbara S. Pedersen

(57) ABSTRACT

The present invention relates to an automated massage apparatus (10) having a substantially horizontal bed (20) which provides a massage surface (12). A massage element or roller (14) can move relative to the massage surface to provide an automated massage to the whole or selected parts of the body of a user lying upon the bed.

20 Claims, 6 Drawing Sheets

(52) U.S. Cl.
CPC ................ *A61H 2015/0014* (2013.01); *A61H 2201/0142* (2013.01); *A61H 2201/1207* (2013.01); *A61H 2201/1671* (2013.01); *A61H 2203/0443* (2013.01)

(58) Field of Classification Search
CPC .... A61H 2201/1626; A61H 2201/1669; A61H 2201/5002; A61H 2201/5064; A61H 2205/081; A61H 15/00; A61G 13/009; A61G 13/105
See application file for complete search history.

(56) References Cited

U.S. PATENT DOCUMENTS

| | | | | |
|---|---|---|---|---|
| 5,020,518 | A * | 6/1991 | Spears | A61H 15/0078 601/102 |
| 6,840,914 | B1 * | 1/2005 | Takamura | A61H 15/0078 601/102 |
| 2002/0058973 | A1 * | 5/2002 | Lee | A61H 15/0078 607/96 |
| 2004/0122343 | A1 * | 6/2004 | Mori | A61H 15/0078 601/102 |
| 2004/0260215 | A1 | 12/2004 | Kim | |
| 2005/0015029 | A1 | 1/2005 | Kim | |
| 2007/0185421 | A1 | 8/2007 | Wu | |
| 2014/0188018 | A1 | 7/2014 | Vaughn | |

FOREIGN PATENT DOCUMENTS

| | | |
|---|---|---|
| EP | 0060934 A1 | 9/1982 |
| JP | S57176228 | 11/1982 |
| JP | H08215264 | 8/1996 |
| KR | 20040024674 | 3/2004 |

OTHER PUBLICATIONS

PCT (International) Search Report for Applicant's PCT/EP2019/055082, dated Jun. 4, 2019.

UK Search and Examination Report for Applicant's corresponding application GB1902744.0, dated Jul. 24, 2019.

China National Intellectual Property Administration, Notification of the First Office Action, dated Jun. 2, 2021, Filing No. 201980013748.6, Applicant: Grey Technology Ltd.

* cited by examiner

AUTOMATED MASSAGE APPARATUS

FIELD OF THE INVENTION

The present invention relates to an automated massage apparatus.

In the following description, unless otherwise indicated, directional and orientational terms such as "below", "top" etc. apply to the apparatus in its normal orientation of use as shown in the drawings.

BACKGROUND TO THE INVENTION

Massage is a widely used and well respected form of therapy for humans and also for some animals. In general terms massage involves the application of pressure upon a chosen area of the body, typically to relieve muscular aches and pains. Often, the application of pressure will be moved across the chosen area so that the pressure applied in the chosen area is varied during the massage.

Massage can be performed by one person upon another, the masseur applying pressure typically by way of the hands, and often moving his or her hands across the chosen area of the body so that the affected muscles or the like are subjected to varying pressure. The combination of pressure and movement is a typical attribute of massage.

A person can massage his or her own body, either directly if the chosen area is accessible, or indirectly by way of a suitable massaging tool. Alternatively, massage can be performed upon a person by an automated massage apparatus. An automated massage apparatus typically has a massage surface which can be held against a chosen area of the user's body. The user will typically press the massage surface against the chosen area, often by resting a portion of his or her body weight upon or against the massage surface. The apparatus has one or more massaging elements which are driven to move relative to the massage surface and thereby relative to the chosen area of the user's body, so as to vary the pressure across the chosen area and simulate the activity of a masseur.

One example of an automated massage apparatus is a massage cushion, the cushion containing one or more electric motors which can move one or more massaging elements within the cushion. The user presses the chosen part of his or her body against the massage surface of the cushion and the massaging element(s) is(are) moved relative to the massage surface, and thereby moved relative to the chosen part of the user's body, so as to massage the chosen part. Another example is a massage seat as often found in airports and the like, and also in some motor vehicles.

The relevant features of an automated massage apparatus (and which are shared by the present invention) are firstly that a user is able to undertake a massage on his or her own body and does not need the assistance of a masseur. Secondly, the apparatus includes a massage surface and one or more massaging elements which can move relative to the massage surface so that the pressure applied to a chosen area of the user's body can be moved without the user needing to move his or her body or the massage surface.

One disadvantage of the known automated massage apparatus is that they are limited in the areas of the body which can be massaged. A massage cushion for example can only be used to massage small areas of the body at a time, and the person must move the cushion, or him/herself, or both, between massaging operations if an extended area of the body is to be massaged. A massage seat for example, especially the massage seat of a motor vehicle, can generally only massage a user's back, buttocks and/or the backs of the upper legs, although the user may be able to move sufficiently to permit also the massaging of parts of the neck. Whilst the back is understood to be an area of the body often requiring a massage, not being able to massage the lower legs and perhaps also the front of the torso and the front of the upper legs, is a significant disadvantage.

Another disadvantage of the known automated massage apparatus is that it is not always possible to apply sufficient pressure to obtain an effective massage in the chosen area. Thus, whilst it is possible to rest a massage cushion upon an affected part of the user's body, the weight of the massage cushion is typically not sufficient to provide the desired pressure. Also, the user may not be able to position him or herself appropriately and comfortably so as to allow his or her body weight to provide sufficient pressure in the chosen area. For example, if the user wishes to massage his or her back with the massage seat of a motor vehicle, he or she can often only apply a small proportion of his or her body weight by leaning against the massage surface of the seat; whilst the pressure can be increased by pressing against the steering wheel that may induce strain elsewhere in the user's body, and can be dangerous whilst driving.

Accordingly, it is a major drawback that the user must typically provide all or at least a large part of the force necessary to press the chosen area against the massage surface of the known automated massage apparatus. The requirement to press a particular muscle (or muscle group) for example against the massage surface can often cause unwanted strain in other muscles or groups of muscles, and can limit the duration of an effective massage. The general desire to use the user's body weight to provide the necessary pressure by simply resting the chosen area upon the massage surface is not always possible for the known automated massage apparatus, nor for particular chosen areas of the user's body.

SUMMARY OF THE INVENTION

The present invention seeks to provide an automated massage apparatus which avoids or reduces the above-stated disadvantages. The present invention also seeks to provide a portable massage apparatus which can readily be moved to a desired location.

According to the invention there is provided an automated massage apparatus having a massage surface and a massage element which can move relative to the massage surface, the massage surface being provided by a substantially horizontal bed.

Preferably the massage surface is at least 1.9 metres long and at least 0.6 metres wide, so that most users can lie substantially horizontally upon the massage surface. A bed is thereby to be understood to be a structure upon which a person can lie with all (or at least a large part) of his or her body substantially horizontal. The ability of the user to lie horizontally upon the massage surface maximises the pressure which can be applied by the user's body weight alone and therefore without effort by the user, i.e. gravity alone will be the cause of most or all of the pressure upon the massage surface.

Desirably, the bed includes a substantially rigid frame to which the massage surface is mounted, the frame including a set of legs which hold the massage surface above the floor. The massage surface is ideally a fabric held substantially tightly by the frame. The massage surface is preferably flexible and resilient so as to conform to the contours of the user's body and maximise the user's comfort. In embodiments in which the automated massage apparatus is portable the bed can be foldable and/or collapsible in similar fashion to a camp bed or the like. In one embodiment the collapsible bed is assembled from components which can be separated to disassemble (or collapse) the bed.

Preferably the massage surface is not uniform across its full area. In one embodiment a first region of the massage surface is locally deformed or extended so that in use that region's response to the contours of a user's body are exaggerated as compared to the remainder of the massage surface. In another embodiment a second region of the massage surface is locally reinforced or supported so that in use that region's response to the contours of a user's body are diminished as compared to the remainder of the massage surface. The local reinforcement or support can be adjusted, preferably by the user, to enhance the massage provided to the parts of his or her body in and adjacent to the second region. The provision of a non-uniform massage surface enhances the massage in selected areas of the user's body. Despite the regions of local deformation and/or local reinforcement the massage surface is nevertheless substantially horizontal in use.

The massage element is preferably located underneath the massage surface of the bed. With the user lying upon the massage surface of the bed the massage element engages and presses against the underside of the massage surface and is moved relative to the massage surface. The pressure exerted by the massage element upon the underside of the massage surface is transmitted through the material of the massage surface to the user to achieve the desired movement of pressure across the chosen area of the user's body.

Preferably, the massage element comprises a roller. Desirably the roller is driven to traverse (horizontally) relative to the massage surface, preferably along all or part of the length of the massage surface and bed. Preferably the roller rotates as it traverses the massage surface so that the roller rolls along the underside of the massage surface rather than sliding across the underside of the massage surface, whereby to reduce the likelihood of wear upon the massage surface. Ideally the roller is not driven to rotate but rather is mounted upon bearings so that it rotates passively due to its frictional engagement with the underside of the massage surface.

Desirably, the apparatus includes a motor housing to which the massage element is mounted. Desirably also, the motor housing is arranged to traverse relative to the bed, so that the traverse of the massage element is caused directly by traverse of the motor housing.

Preferably, the massage element is movable in the vertical direction relative to the motor housing, whereby to move the massage element into and out of engagement with the underside of the massage surface. Movement in the vertical direction can also be used to adjust the pressure of the massage element upon the underside of the massage surface and thereby upon the chosen area of the user's body. Thus, it will be understood that when a user is lying upon the bed his or her body weight can be totally supported by the massage surface. The massage element can be raised into engagement with the underside of the massage surface and can press upwardly upon the massage surface and the user's body above, the pressure upon the user's body being determined by the upwards force applied by the massage element. By adjusting the upwards force of the massage element the user can adjust the applied massaging pressure.

The bed preferably includes a guide rail for the motor housing, the guide rail desirably running parallel to the length of the bed. The guide rail can simply serve to guide the motor housing for movement along the bed. Preferably, however, the guide rail has a rack and the motor housing has a pinion so that the guide rail also acts as part of the drive mechanism for the traverse of the motor housing.

Desirably, the motor housing includes a wheeled carriage, the wheels of the carriage being located to engage the floor during use. The wheeled carriage can be made sufficiently robust to support the weight of the motor housing and also to withstand the reaction to the upward force applied to the massage surface. The weight of the motor housing and the reaction to the upward force do not therefore need to be supported by the guide rail and the strength and rigidity of the guide rail can be reduced to a level appropriate for guiding and driving (but not supporting) the motor housing. Reducing the strength and rigidity of the guide rail will permit a reduction in its weight, facilitating the portability of the apparatus.

Desirably, the motor housing is removable from the guide rail. In a portable massage apparatus it is desirable to provide separable components so as to facilitate collapse of the bed. It is also desirable to reduce the weight of the separable components to facilitate transportation to a location of use.

BRIEF DESCRIPTION OF THE PREFERRED EMBODIMENTS

The invention will now be described in more detail, by way of example, with reference to the accompanying drawings, in which.

DETAILED DESCRIPTION

Figure 3:
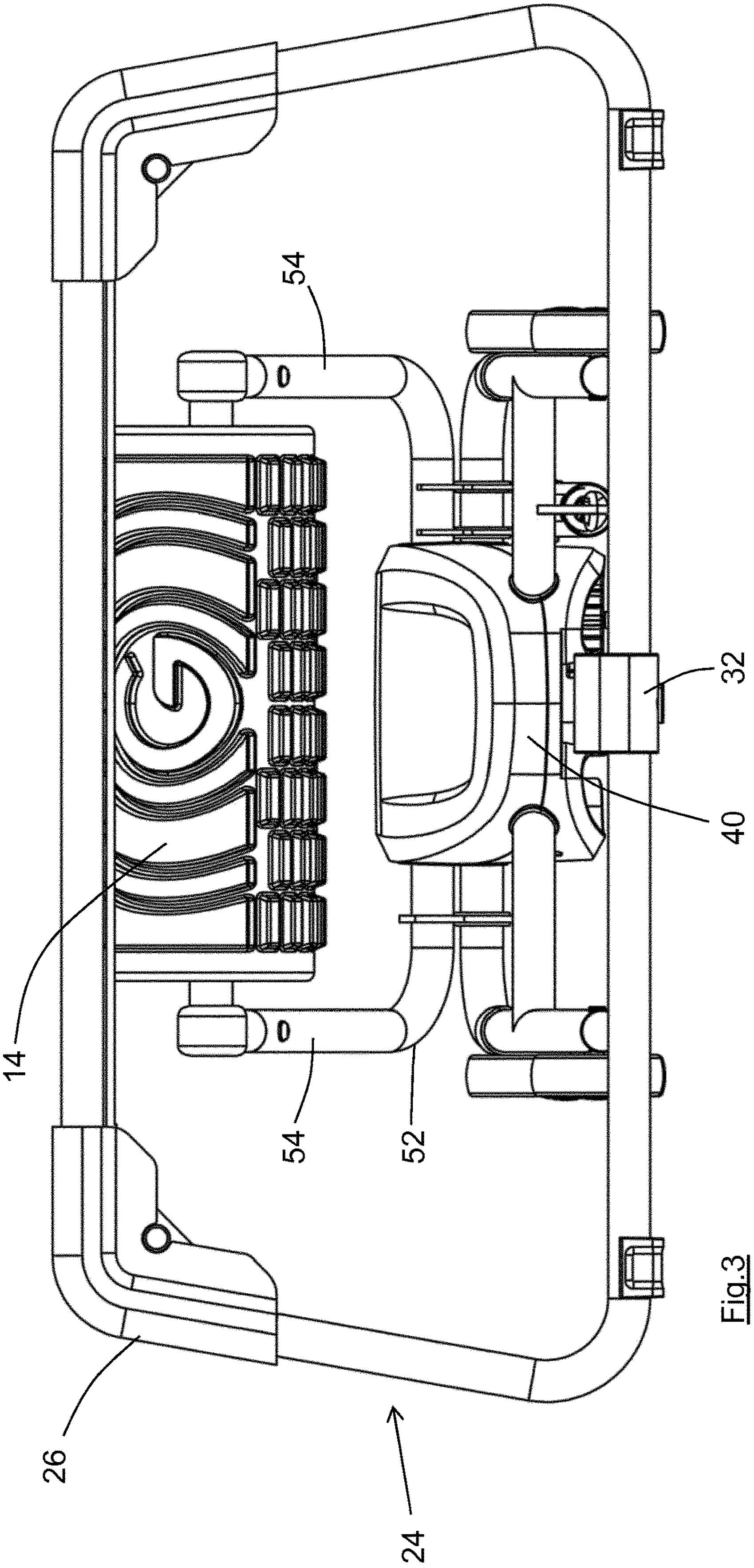
FIG. 3 shows an end view of the apparatus of FIG. 1.
Figure 4:
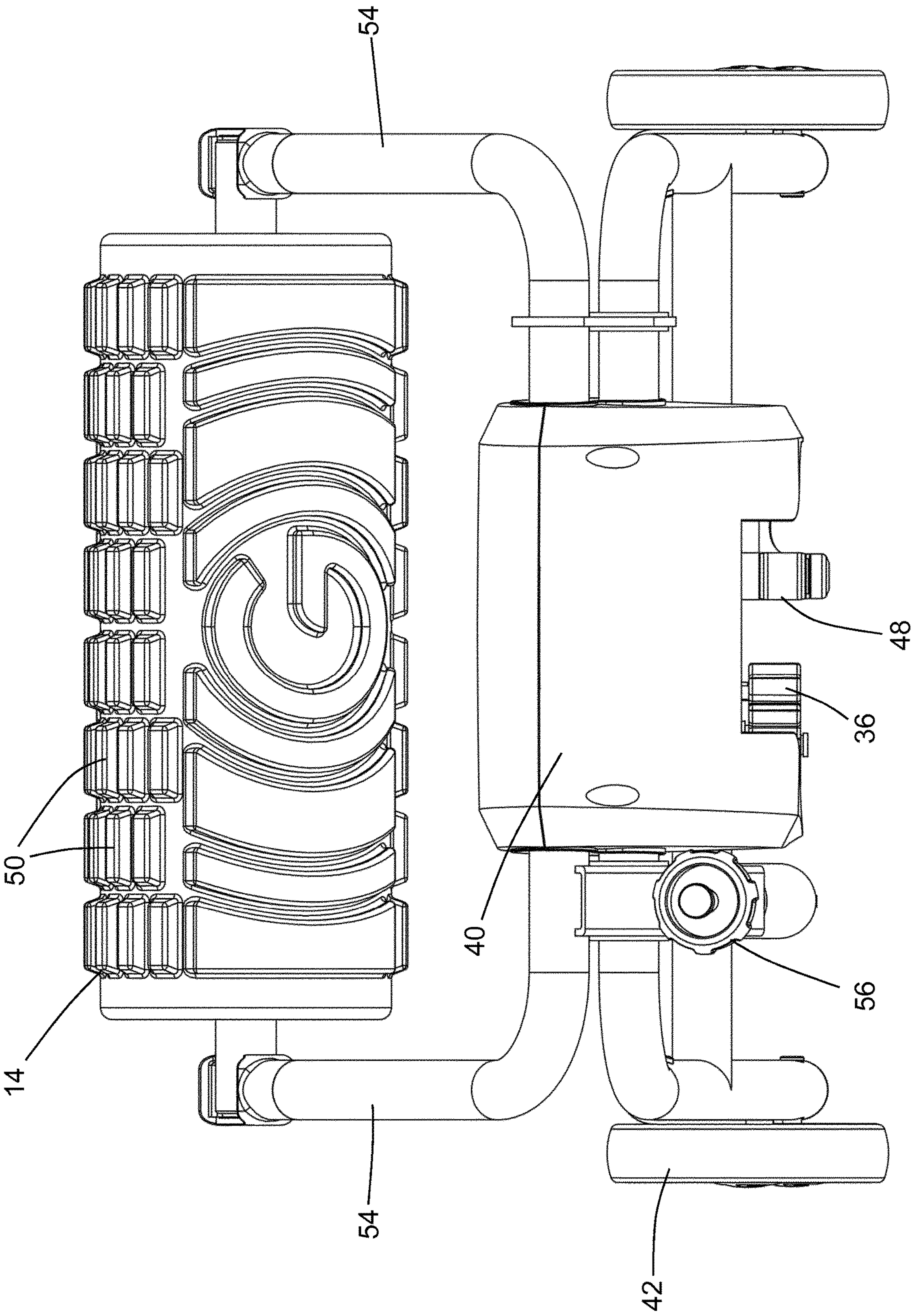
FIG. 4 shows a view of the motor housing and massage element, in the opposite direction of view to that of FIG. 3.
Figure 5:
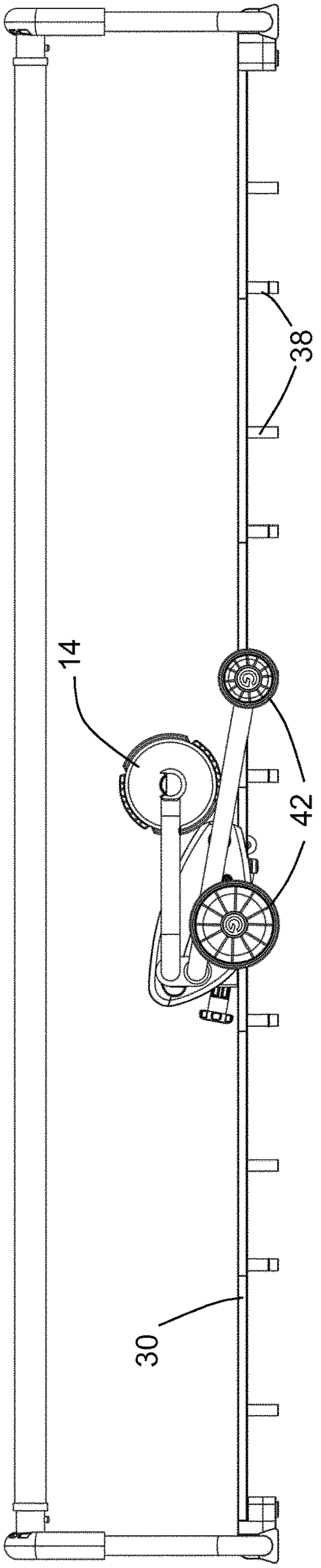
FIG. 5 shows a side view of the apparatus of FIG. 1, with the massage element in a lowered, non-use position.
Figure 6:
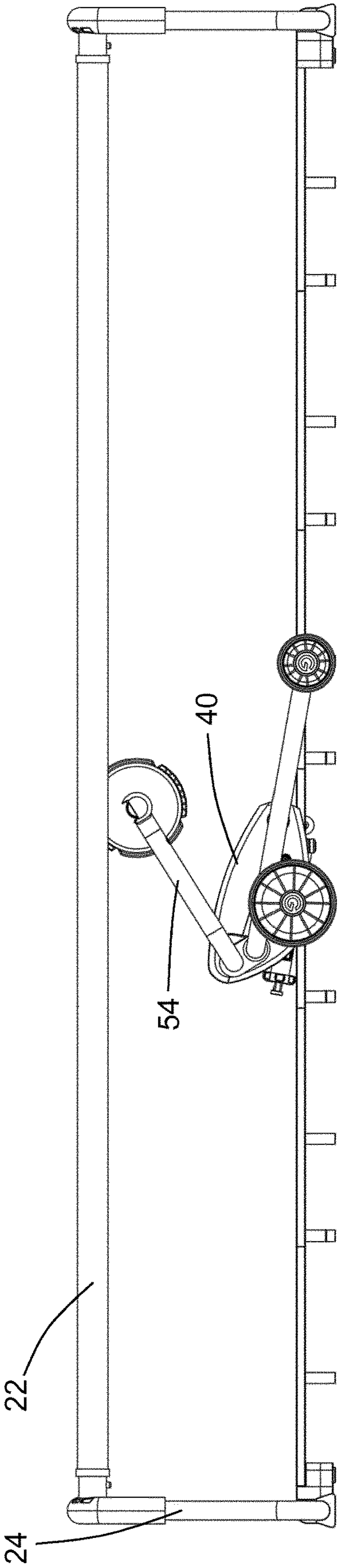
FIG. 6 shows a view as FIG. 4 but with the massage element in a raised in-use position.

The automated massage apparatus 10 has a massage surface 12 and a massage element 14 (see FIGS. 2-6). The massage element 14, in its raised in-use position as shown in FIGS. 3 and 6), can move relative to (along) the massage surface 12.

The massage surface 12 is part of a bed 20, in this embodiment a collapsible bed similar to a camp bed. The massage surface 12 comprises a layer of material, ideally a fabric material, which is mounted upon two substantially linear frame members 22, the frame members being supported by legs 24 at each end of the bed 20. The legs 24 each comprise a structure of trapezoidal shape, i.e. with two horizontal members joined by two inclined members, the inclined members converging towards their top.

Each end of the frame members 22 has a connector (not seen). Each of the legs 24 has two corner members 26. It is arranged that each corner member 26 has an opening (not seen) to receive a connector whereby the frame members 22 can be connected to the legs 24. In this embodiment the connector is releasably secured to the corner member 26 by a latch mechanism (not shown), the latch mechanism permitting separation of the frame member 22 from the corner member 26 for disassembly of the bed 20.

It will be understood that the detailed structure of the bed 20 is not relevant to the present invention and any suitable bed which is able to support the user's weight, and is preferably lightweight and foldable or otherwise collapsible, could be used. It will nevertheless be understood that the relationship between the bed 20 and the massage element 14 is important, and in particular the height of the bed 20 must be appropriate to the in-use position of the massage element.

The frame members 22, legs 24 and mounting members 26 together comprise the frame of the bed 20.

As most clearly seen in FIGS. 5 and 6, the lower horizontal member of the legs 24 are interconnected by a guide rail 30. Each end of the guide rail 30 has a respective connector which can be releasably secured to a mounting member 32 carried by the lower horizontal member of each leg 24. The guide rail 30 is therefore removable from the frame of the bed 20 when desired. Though not shown in the drawings, one or both of the mounting members 32 preferably includes means for tensioning the guide rail 30 between the legs 24 whereby to secure the guide rail 30 to the frame of the bed 20. One suitable arrangement could include an adjustment slot in the mounting member and a tightening knob permitting the user to secure the guide rail 30 in position. Thus, it will be recognised that it is desirable to secure the guide rail 30 in position relative to the bed 20, notwithstanding that the guide rail is removable for storage and transportation.

In this embodiment the guide rail 30 includes a rack 34. The rack 34 is engaged by a pinion 36 (see FIG. 4) mounted upon the motor housing 40. The motor housing 40 contains a motor (ideally an electric motor) which drives the pinion 36 to rotate and thereby to cause the motor housing 40 to traverse along the guide rail 30 and thereby along the massage surface 12.

FIGS. 5 and 6 shows the series of legs 38 which are mounted to the guide rail 30 and which support the guide rail, especially when the massage apparatus is in use. It is recognised that the behaviour of the rack in relation to the bed and the floor upon which the bed is resting depends to some extent upon whether the floor is a hard floor or is carpeted. The legs 38 are positioned to provide point bearing against the floor as the motor housing 40 passes along the bed. 20

The motor housing 40 includes a wheeled carriage having four wheels 42. The wheels 42 engage the floor and support the weight of the motor housing 40. In this embodiment therefore the guide rail 30 is not required to support any of the weight of the motor housing 40 and needs to be made sufficiently robust only to permit the pinion 36 to drive the motor housing 40 along the guide rail 30 during use. Whilst it can be expected that the force required to drive the motor housing 40 to traverse along the guide rail 30 during use might be significant, avoiding any requirement for the guide rail to support the weight of the motor housing 40 can permit a significant reduction in the strength and weight of the guide rail 30. In alternative embodiments the guide rail can be made sufficiently robust to support at least part of the weight of the motor housing if that is desired.

The massage element 14 is mounted to the motor housing 40, and in this embodiment is in the form of a single roller. The roller 14 is mounted upon a U-shaped beam 52 having two arms 54, the arms supporting opposing ends of the roller 14. The U-shaped beam 52 is pivotably mounted to the motor housing 40, and can move from a lowered non-use position of FIG. 5 to a raised in-use position of FIG. 6.

To use the automated massage apparatus, the user lies upon the massage surface 12 of the bed 20. The beam 52 is pivoted so as to raise the roller 14 into the fully-raised or in-use position of FIGS. 3 and 6. The pinion 36 is driven to rotate so that the motor housing 40 moves along the guide rail 30 and the roller 14 is moved along the underside of the massaging surface 12, the speed of traverse being controllable by the user.

Figure 1:
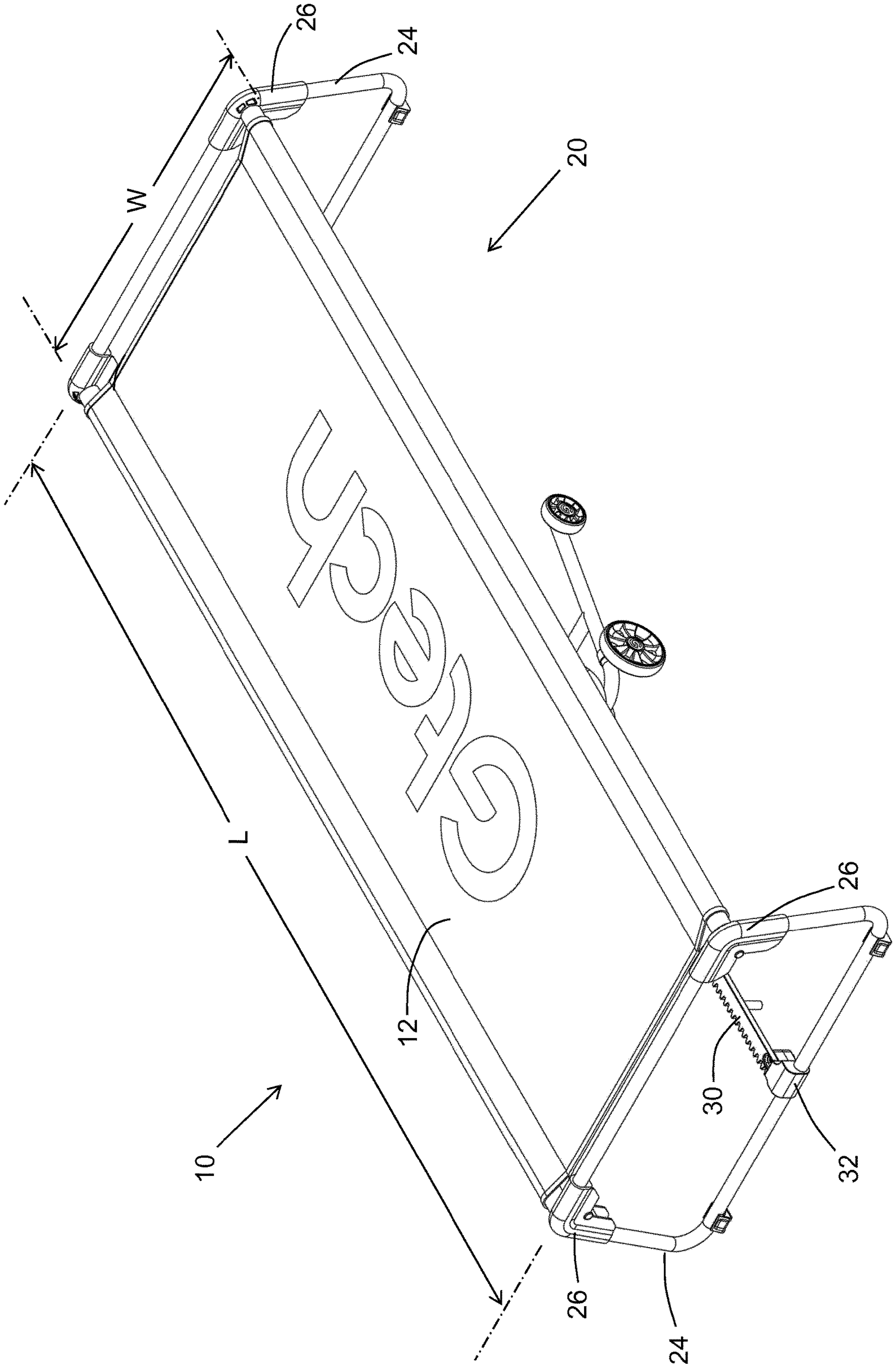
FIG. 1 shows a perspective view of an automated massage apparatus according to the present invention.
Figure 2:
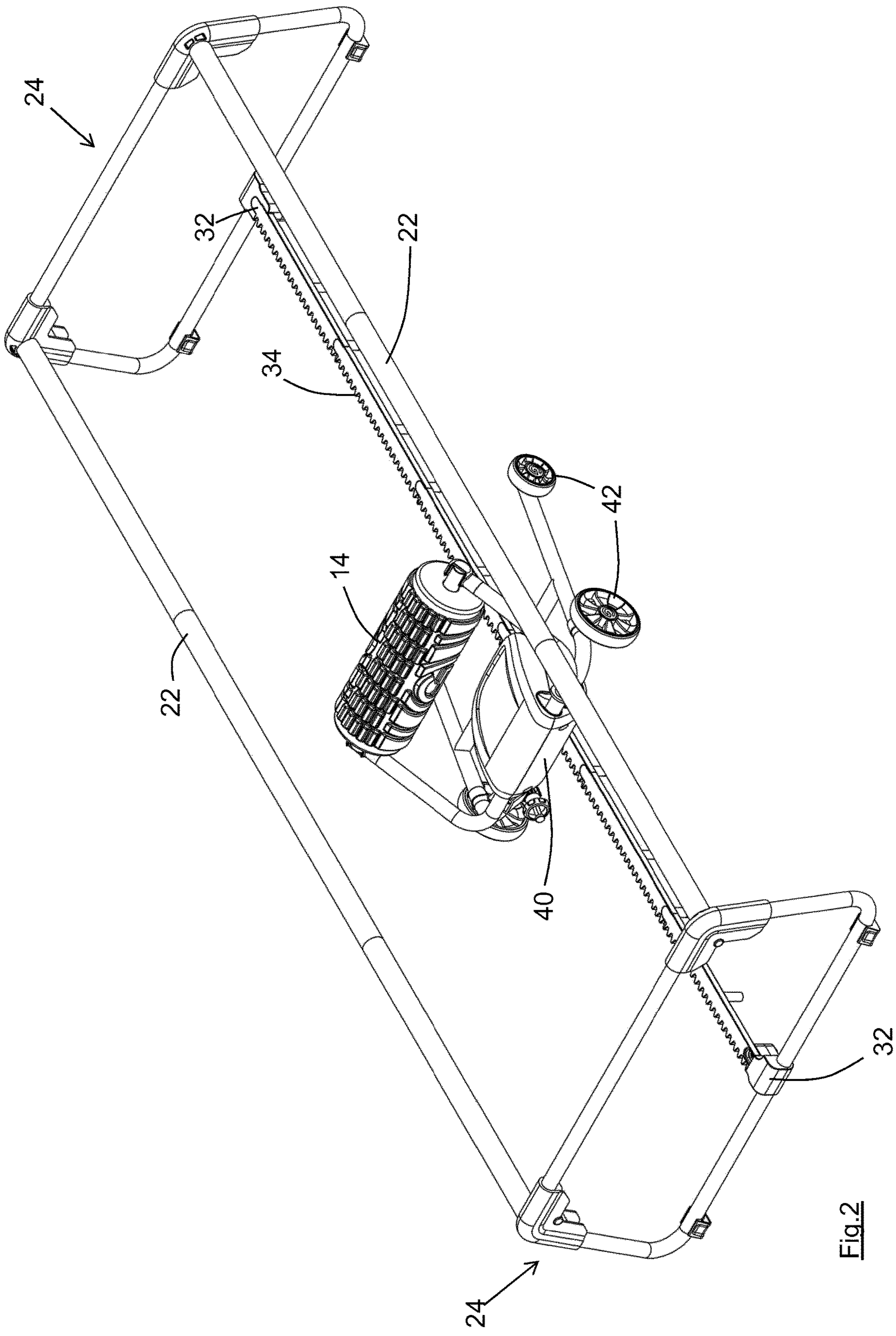
FIG. 2 shows a view similar to FIG. 1 but with the massage surface removed to show the underlying components.

It will be understood that the user's body weight will depress the massage surface 12 downwardly from the flat condition of FIG. 1. The upwards force of the roller 14 upon the underside of the massage surface 12 will act to lift the massage surface 12 locally, and thereby also lift a part of the user's body, thereby causing the desired pressure upon that part of the user's body.

Accordingly, as it passes along the bed 20 the roller 14 is forced to move away from its fully-raised position by the contours of the user's body. Though not shown in the drawings, a torsion spring is connected to the beam 52 to bias the beam 52 towards its fully raised position. As the roller 14 passes along the bed 20 it is pressed upwardly against the user's body by the torsion spring, the force of the spring ensuring an approximately consistent pressure upon the user's body. The tension in the torsion spring can be adjusted by the control knob 56, permitting the user to vary the force upon the beam 52 and thereby to vary the pressure exerted by the roller 14.

The control system of the automated massage apparatus will preferably be arranged to reciprocate the motor housing 40 along the guide rail 30, with the user able to control the portion of the guide rail 30 along which the motor housing moves (and perhaps to adjust or vary that portion during use). One suitable control system mounts a number of indicators, for example in the form of a contrasting register (similar to a barcode) upon the guide rail 30 and an emitter (for example an infra-red emitter) upon the motor housing 40. The control system is able recognise the varying reflection from the register in order to determine the position of the motor housing along the guide rail 30. The configuration of the register (for example the spacing between neighbouring reflective lines) can vary along the full length of the guide rail so that the control system can recognise its position anywhere along the guide rail.

In a less desirable embodiment, indicators can be provided only adjacent to the ends of the guide rail (or the configuration of the register can vary only adjacent to the ends of the guide rail) so that the control system can detect its approach to the ends of the guide rail and can be configured to reverse direction before it reaches the ends of the guide rail. In such embodiments the motor housing 40 will reciprocate along substantially the full length of the bed 20.

As a further safeguard, the guide rail 30 can have end stops (or the teeth of the rack 34 can terminate at the ends of the guide rail) to prevent the movement of the pinion 36 off the end of the rack 34 (and the control system can recognise the forced stoppage of the pinion and switch the direction of rotation).

In the preferred embodiments in which the control system can recognise the position of the motor housing 40 anywhere along the guide rail 30, the control system can be configured to permit the user to set a reduced length of traverse for the motor housing. If the user wishes only to massage a selected part of his or her body (for example the lower back), the user can actuate a control switch when the roller 14 reaches the respective ends of the selected part of the body. The control system can record those positions of the motor housing 40 relative to the guide rail 30 for the duration of the massage and can subsequently automatically reverse the direction of rotation of the pinion 36 when the chosen positions are reached. In this way, the automated massage apparatus 10 can be arranged to reciprocate the roller 14 along a selected part of the user's body, as desired. In the event that the user does not actuate the control switch during a subsequent massage the control system defaults to a condition in which the motor housing is automatically reversed only adjacent to the ends of the guide rail so that the whole length of the user's body is massaged.

It can also be arranged that the control system can adjust the pressure exerted by the massage element. As above stated, a torsion spring is connected to the beam 52 which biases the roller 14 towards the underside of the massage surface 12. In addition to (or instead of) the user adjustment provided by the control knob 56, it can be arranged that the control system includes a motor connected to the torsion spring (such that the torsion spring lies between the motor and the beam 52). The control system can therefore drive the torsion spring to move the roller 14 between its lowered non-use position (FIG. 5) and its raised in-use position (FIG. 6). The location of the torsion spring between the motor and the beam 52 will permit the roller 14 to move up and down in use along the contours of the user's body as above stated. The control system can nevertheless actuate the motor to increase or decrease the force applied by the torsion spring so as to increase or decrease the pressure exerted by the roller 14. The user can if desired instruct the control system to adjust the pressure exerted during use, and/or can instruct the control system to adjust the pressure according to the position of the motor housing 40, the latter enabling an increase or decrease in the pressure exerted upon different parts of the user's body.

In this embodiment the controller for the control system is located in the motor housing 40 and mains electrical power is communicated to the controller and to the motor(s) of the motor housing by an electrical wire (not shown).

By arranging the massage surface 12 to be (substantially) horizontal, it is arranged that the user's body weight can directly oppose the force applied by the massage element 14, and the likelihood of strain upon other parts of the user's body is minimised.

Also, it is arranged that the length L of the bed is around 1.90 meters and the width W of the bed is around 0.6 metres. Such dimensions are expected to be able to accommodate most users, and to permit the user to lie substantially flat upon the massage surface 12. The user will typically lie face up on the massage surface but can if desired lie face down or on his or her side. Since the roller 14 can be moved along substantially the full length of the massage surface 12, the user is able to massage almost all of his or her body, and thereby almost any chosen part of his or her body.

The roller 14 is mounted to the arms 54 by way of bearings (not seen), so that the roller 14 is relatively freely rotatable. In this embodiment therefore the roller 14 is not driven to rotate directly and instead its rotation is determined by its frictional engagement with the underside of the massage surface 12. The roller 14 is ideally made from a soft compressible material with a surface friction coefficient sufficient to enable free rotation when under the typical loads due to the massaging pressure so that it rotates rather than slides as it is driven across the underside of the massage surface 12.

It will be seen from FIG. 4 in particular that the surface of the roller 14 is made uneven, with many peaks 50 separated by troughs. It is generally recognised that a massaging element should preferably have a non-planar surface so as to provide localised areas of higher pressure and lower pressure during use.

The material of the massage surface 12 of the bed 20 is substantially uniform and is under substantially uniform tension so that the massage surface is substantially flat when not in use. The material stretches and/or deforms (downwardly) when a user lies upon the bed, the deformation at different parts of the massage surface depending upon the weight of the different parts of the user's body. The (upwards) pressure applied by the roller 14 in use will therefore vary somewhat as it traverses the user's body, depending upon the contours of the user's body and the local deformations.

Figure 7:
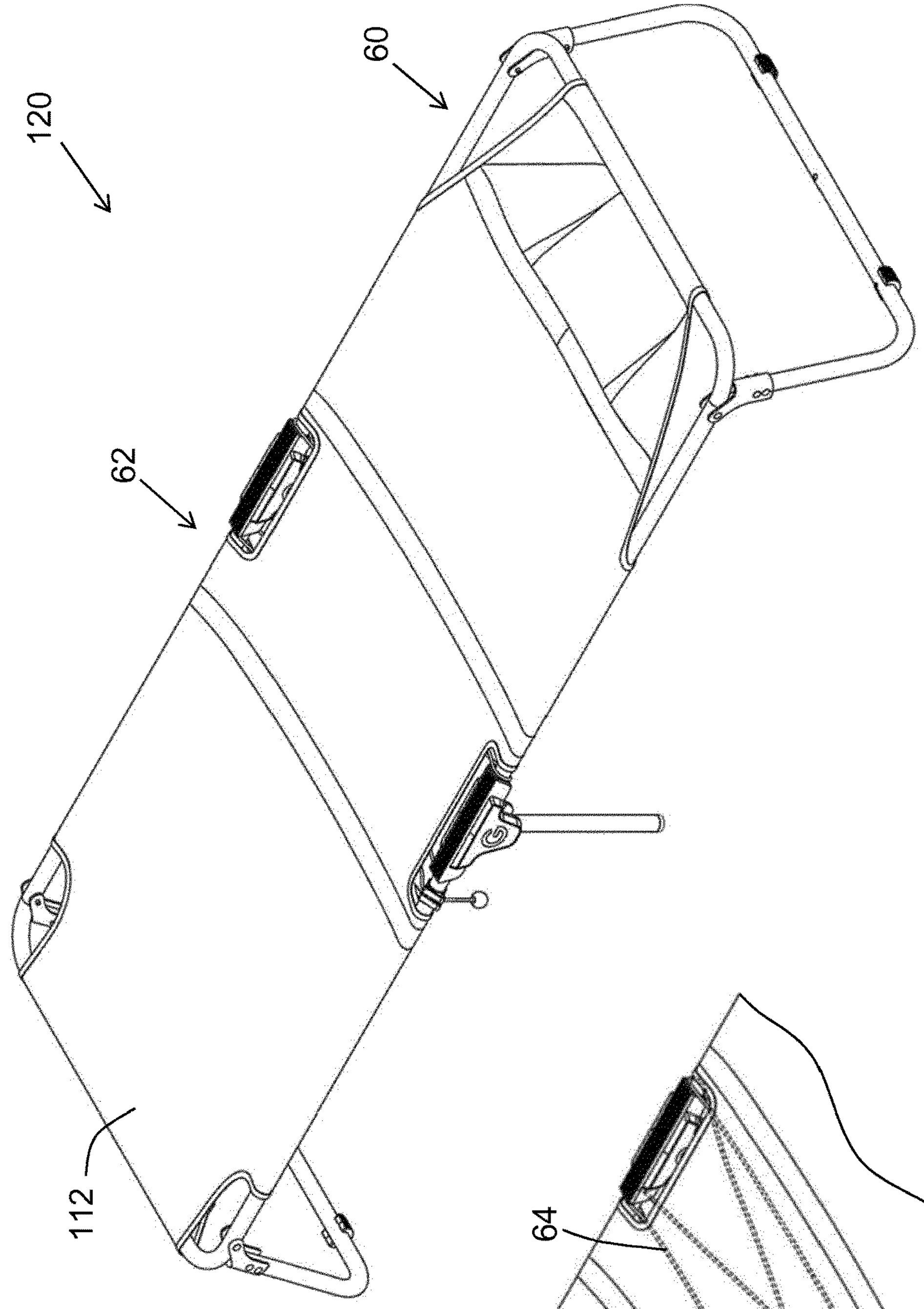
FIG. 7 shows a perspective view of an alternative bed for use in an automated massage apparatus according to the present invention.
Figure 8:
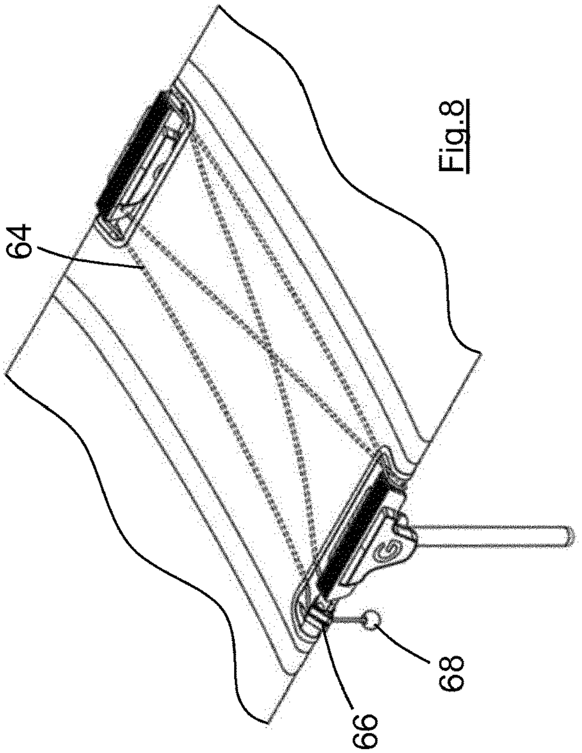
FIG. 8 shows a part of the bed of FIG. 7.

FIGS. 7 and 8 show an alternative design of bed 120 with a non-uniform massage surface 112. Because the massage surface 112 is not uniform the local deformations in use do not depend only upon the weight of the particular parts of the user's body and the deformations can be exaggerated and/or diminished in order to enhance a massage.

The first difference of the alternative design of bed 120 is that the material of the massage surface 112 is extended at a first region 60 of the bed 120. It is intended that the user will lie upon the bed 120 with his or her feet in the region 60. It is recognised that the lower legs are not particularly heavy and together with the proximity to the surrounding frame of the bed 120, a substantially uniform massage surface will usually deform significantly less adjacent the user's feet than in other areas. In this alternative embodiment the material (which may be canvas for example) which forms the massage surface 120 includes darts and pleats in the region 60 so that when not in use the massage surface 120 in the region 60 lies somewhat below the remainder of the massage surface (perhaps around 12 cm lower for example). In use therefore, the user can lie with his or her feet in the local depression provided at the region 60.

The local depression at the region 60 has two benefits when the massage apparatus is in use with the user lying upon his or her back. The primary benefit is that the user's feet are lowered and the pressure upon a user's heels is reduced; this relieves tension in the heel to calf region of the lower leg. The secondary benefit is that the user's lower legs rest closer to the floor and the pressure which is applied to the lower legs by the massage element is increased; this give an enhanced (deeper) massage to that area of the user's body.

The second difference is that the massage surface 120 is locally reinforced at a second region 62. The second region 62 includes a double-layer of material. The double-layer is optional and provides some localised additional support. The major benefit of the double-layer, however, is that it permits a lattice cord 64 (shown in dashed outline in FIG. 8) to pass across the bed 120 between the two layers of material. The lattice cord 64 can be tensioned to allow users with a large range of weights and body shapes to use a massage apparatus incorporating the bed 120.

The second region 62 is located at the centre of the bed 120 and is therefore where the user's buttocks will typically rest. The additional localised support provided in the second region 62 results in the deformation (depression) caused by this relatively heavy part of the user's body to be reduced. The deformation at this region of the massage surface 112 is also increased because it is the furthest spaced from the frame of the bed 120. The inventors have found that providing additional localised support adjacent to the buttocks of some users enhances the massage provided to the user's lower back.

Whilst the double-layer material in the second region 62 of the massage surface 112 provides a small degree of additional support for all users, the lattice cord 64 enables the degree of additional support to be temporary and adjustable to suit the user. The ends of the lattice cord 64 pass through and are retained by a cleat 66 attached to the side of the bed 120; the user can pull one end of the cord 64 by way of a toggle 68 to increase the tension in the cord (and can release the cleat 66 to reduce the tension in the cord) and thereby to adjust the degree of additional support provided in the second region 62.

It will be understood that the temporary additional support in the second region could alternatively be provided by way of supporting straps, webbing or netting above or below the massage surface.

Whilst the bed 120 is shown without a guide rail and without a motor housing and massage element, it will be understood that the bed 120 could include mounting members for a guide rail (such as the mounting members 32 for a guide rail 30 of the bed 20) to provide an automated massage apparatus similar to that shown in the first embodiment.

When the automated massage apparatus 10 is not in use it can be disassembled for storage and/or transportation. The pinion 36 is held against the rack 34 by a series of rollers 48 (one of which can be seen in FIG. 4). Such an arrangement allows the motor housing 40 to be lifted from the guide rail 30 and separated from the bed 20 (120). It is arranged that the motor housing 40 can move very close to the legs 24 whereby to permit the motor housing to be grasped from an end of the bed 20 and lifted between the horizontal members of the leg 24. The tension in the guide rail 30 can then be released and the guide rail 30 removed from the legs 24 and separated from the other components. The frame members 22, together with the massage surface 12, can then be released from the end legs 24, whereupon the frame members 22 and massage surface 12 can be rolled up. The legs 24 can be stored as they are, or can be made from separable parts for further disassembly, in known fashion.

It is expected that the automated massage apparatus 10 will be provided with a remote control unit to permit the user to operate the apparatus whilst lying on the bed 20. The remote control unit can communicate with the controller of the control system by wire or wirelessly. The remote control apparatus can be used to instruct the control system to move the massage element 14 between its lowered and raised positions at the start and end of a massage, and/or to adjust the speed of traverse of the massage element along the bed, and/or to adjust the pressure exerted by the massage element. In the preferred embodiments described the remote control unit can also be used to set the reversing positions for the motor housing 40 in the event that the user wishes to massage only a selected part of his or her body.

The invention claimed is:

1. A portable automated massage apparatus having a massage surface and a massage element which is movable relative to the massage surface, the massage surface being provided by a substantially horizontal bed, the bed including a substantially rigid frame to which the massage surface is mounted, the frame including a set of legs which hold the massage surface above a floor in use, the massage element being mounted to a motor housing, the motor housing including a wheeled carriage, the wheels of the carriage being located to engage the floor during use, the bed having a guide rail for the motor housing, the motor housing being removable from the guide rail and the guide rail being removably mounted to the frame, the bed being assembled from separable components which enable disassembly of the bed.

2. The automated massage apparatus of claim 1 in which the massage surface is a fabric held substantially tightly by the frame.

3. The automated massage apparatus of claim 1 in which the massage surface is flexible and resilient.

4. The automated massage apparatus of claim 1 in which the massage surface is non-uniform and includes localised deformations.

5. The automated massage apparatus of claim 1 in which the massage surface is non-uniform and includes localised additional support.

6. The automated massage apparatus of claim 1 in which the massage element is located below the massage surface.

7. The automated massage apparatus of claim 1 in which the massage element comprises a roller.

8. The automated massage apparatus of claim 7 in which the roller is driven to traverse the massage surface.

9. The automated massage apparatus of claim 7 in which the massage surface has a length and in which the roller is adapted to traverse substantially the full length of the massage surface.

10. The automated massage apparatus of claim 7 in which the roller rotates as the roller traverses the massage surface.

11. The automated massage apparatus of claim 10 in which the roller is mounted upon bearings to rotate passively due to the roller's frictional engagement with the massage surface.

12. The automated massage apparatus of claim 1 in which a surface of the massage element is uneven.

13. The automated massage apparatus of claim 1 in which the massage element is adapted to exert a pressure upon an underside of the massage surface, the apparatus having means to adjust the pressure.

14. The automated massage apparatus of claim 1 in which the bed has a longitudinal axis and in which the motor housing is arranged to traverse in a direction substantially aligned with the longitudinal axis.

15. The automated massage apparatus of claim 1 in which the massage element is movable vertically relative to the motor housing.

16. The automated massage apparatus of claim 1 in which the guide rail has a rack and the motor housing has a pinion.

17. The automated massage apparatus of claim 1 having a controller for the massage element, the guide rail having at least one indicator and the motor housing having a detector by which the controller is adapted to identify a position of the motor housing relative to the guide rail.

18. The automated massage apparatus of claim 17 in which the guide rail has respective indicators adjacent to each end of the guide rail.

19. The automated massage apparatus of claim 17 in which the guide rail has a length and has respective indicators along substantially the full length of the guide rail.

20. The automated massage apparatus of claim 1 in which the massage surface is at least approximately 1.9 metres long and at least approximately 0.6 metres wide.

* * * * *